United States Patent
Wakitani et al.

(10) Patent No.: US 6,756,750 B2
(45) Date of Patent: Jun. 29, 2004

(54) ELECTRIC VEHICLE

(75) Inventors: Tsutomu Wakitani, Wako (JP); Yoshinori Nakagawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/281,022

(22) Filed: Oct. 25, 2002

(65) Prior Publication Data

US 2003/0085677 A1 May 8, 2003

(30) Foreign Application Priority Data

| Nov. 6, 2001 | (JP) | ........................................ 2001-340243 |
| Nov. 16, 2001 | (JP) | ........................................ 2001-352098 |
| Mar. 18, 2002 | (JP) | ........................................ 2002-074939 |
| Mar. 18, 2002 | (JP) | ........................................ 2002-074942 |

(51) Int. Cl.$^7$ .............................................. H02P 1/54
(52) U.S. Cl. ............................ 318/54; 318/55; 318/59; 318/62; 318/66; 318/369; 37/246; 37/247; 37/261; 180/19.2; 180/19.3; 180/65.1; 180/65.3; 180/65.5
(58) Field of Search .............................. 318/54, 55, 59, 318/62, 66, 369; 37/246, 247, 261; 180/19.2, 19.3, 65.1, 65.3, 65.5

(56) References Cited

U.S. PATENT DOCUMENTS

| 4,562,894 | A | * | 1/1986 | Yang | ......................... 180/65.2 |
| 4,783,915 | A | * | 11/1988 | Sasaki et al. | ................. 37/251 |
| 6,327,799 | B1 | * | 12/2001 | Hanafusa et al. | ............. 37/257 |
| 6,499,236 | B2 | * | 12/2002 | Yoshida et al. | ............... 37/219 |
| 6,550,161 | B2 | * | 4/2003 | Hanafusa et al. | ............. 37/246 |
| 6,564,481 | B2 | * | 5/2003 | Wakitani et al. | ............. 37/348 |

FOREIGN PATENT DOCUMENTS

JP          03098404          4/1991

* cited by examiner

Primary Examiner—Rina Duda
(74) Attorney, Agent, or Firm—Adams & Wilks (57) ABSTRACT

An electric vehicle driven by a pair of left and right electric motors is provided. The vehicle includes a controller for controlling the start of the vehicle. The controller performs such control as avoiding brake drag caused by the operation of the electric motors before the elimination of the braking of a pair of left and right parking electromagnetic brakes.

15 Claims, 10 Drawing Sheets

| MODE NAME | DRIVING ELEMENTS | | | |
|---|---|---|---|---|
| | E | F | G | H |
| SHORT CIRCUIT BRAKE MODE | OFF | ON | OFF | ON |
| FORWARD MODE | ON | OFF | OFF | ON |
| REVERSE MODE | OFF | ON | ON | OFF |
| FREE MODE | OFF | OFF | OFF | OFF |

FIG.9

ELECTRIC VEHICLE

FIELD OF THE INVENTION

The present invention relates to an improvement in electric vehicles driven by electric motors and, more particularly, to starting control at hill starts.

BACKGROUND OF THE INVENTION

An electric vehicle of this kind is disclosed, for example, in Japanese Patent Laid-Open Publication No. HEI-3-98404 entitled "COMPACT ELECTRIC VEHICLE." This electric vehicle includes an electric motor as a driving source, an electromagnetic brake which releases the brake when being energized, a current detecting circuit for detecting the energized state of the electromagnetic brake and a controller which outputs an operation command signal to the electric motor when the current detecting circuit detects the energized state of the electromagnetic brake. That is, upon verification of energization of the electromagnetic brake, the electromagnetic brake is assumed to be released from the braking state and the electric motor is operated. This prevents overload to the electric motor due to so-called brake drag caused by the operation of the electric motor before the elimination of the braking of the electromagnetic brake.

At so-called hill start where an electric vehicle a under electromagnetic braking is started on an upgrade, the conventional electric vehicle rolls back during the time between brake release and sufficient power generation of the electric motor, reducing the riding comfort.

An attempt ot release the brake simultaneously with energization of the electric motor so as to avoid the above problem is not preferable because it would cause the electric motor to start rotating before the completion of the brake release, causing the above-described brake drag, and damaging the brake and the electric motor. An electric vehicle that is capable of effectively preventing brake drag and on-grade rollback is thus desired.

SUMMARY OF THE INVENTION

According to the present invention, there is provided an electric vehicle which comprises÷a directional speed member for issuing forward travel, neutral state and reverse travel instructions of the vehicle, a pair of left and right electric motors which operate based on the operation of the directional speed member, a pair of left and right parking electromagnetic brakes for applying holding brakes to the vehicle in the neutral state, and a controller for controlling the start of the vehicle to prevent drag of the parking electromagnetic brakes.

The holding brakes do not mean brakes during travel but brakes such as parking brakes during no travel. Holding braking torque is substantially lower than stopping braking torque. The electromagnetic brakes for holding brakes can be small in volume, leading to reductions in size, weight and cost of the electromagnetic brakes.

The present invention allows effective prevention of brake drag and on-grade rollback of the electric vehicle.

The controller preferably outputs a starting control signal to induce the start of the pair of left and right electric motors with the start of release of the pair of left and right electromagnetic brakes based on information that the directional speed member is switched from neutral to forward travel or reverse travel, and performs such control as gradually reducing the starting control signal output until the electric motors are actually in a rotating state.

The gradual reduction of the starting control signal output means continuous reduction of the signal output relative to time. The gradually reducing speed is set smaller than the releasing speed of the electromagnetic brakes. Too high gradually reducing speed causes too small output of the electric motors before the release of the electromagnetic brakes.

Inducing the start of the electric motors with the start of release of the electromagnetic brakes causes an excess in output of the electric motors due to the small volume of the electromagnetic brakes, causing development of brake drag due to the excessive rotation of the electric motors during the release of the electromagnetic brakes, and shortening the life of the brake shoes. Downward adjustment to gradually reduce the starting control signal output reduces the outputs of the electric motors. This results in practical elimination of the brake drag during the release of the electromagnetic brakes. During the release, the braking torques of the electromagnetic brakes become smaller with time and the electric motors start rotating when the outputs of the electric motors exceed the braking torques of the electromagnetic brakes. Thereafter the operation shifts to normal control.

At hill starts, since the present invention generates a starting control signal for inducing the start of the electric motors with the start of release of the electromagnetic brakes, the sum total of the braking torques of the electromagnetic brakes and the output torques of the electric motors functions as an upgrade rollback stopping force.

The starting control signal output is preferably set smaller than a normal control signal output for rotating the electric motors. If the braking torques of the electromagnetic brakes are too small, the outputs of the electric motors can be excessive, causing brake drag. Setting the electric motor outputs smaller only at starting avoids brake drag. Thus brake drag can be more effectively avoided.

The controller has the functions of: switching the circuits of the pair of left and right electric motors to a short circuit brake mode with the start of release of the pair of left and right electromagnetic brakes based on information that the directional speed member is switched from neutral to forward travel or reverse travel, and maintaining the mode for time t1 required for switching the electromagnetic brakes from a braking state into a released state; switching the circuits of the electric motors to a forward mode or a reverse mode as instructed by the directional speed member while maintaining a control signal to the electric motors at an output corresponding to zero vehicle speed, and maintaining the mode for time t2 required for the circuit switching of the electric motors; and allowing an increase of the control signal output to the electric motors after the lapse of the time t2 and bringing the electric motors into a driving state in accordance with the directional speed member.

Measurements of the time required for the electromagnetic brakes to switch from the braking state to the released state vary because of variation in their mechanical components. A value artificially determined based on an average value of measured values is thus used here as the time t1 corresponding to the time required for the electromagnetic brakes to switch from the braking state to the released state.

As described above, the present invention operates the short circuit brakes while releasing the electromagnetic brakes from the braking state to the released state preparatory to vehicle travel so as to prevent vehicle motion. Then, during the release of the short circuit brakes, the controller outputs a control signal corresponding to zero vehicle speed to cause the electric motors to generate outputs just before travel. This allows the prevention of rollback at hill starts or the like.

After the lapse of the time t1 required for the release of the electromagnetic brakes and the time t2 required for the elimination of the short-circuiting brake circuits, the electric motors are brought into a driving state, so that the occurrence of brake drag can be avoided and increase in volume of the elements used in the electric motor circuits can be limited.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
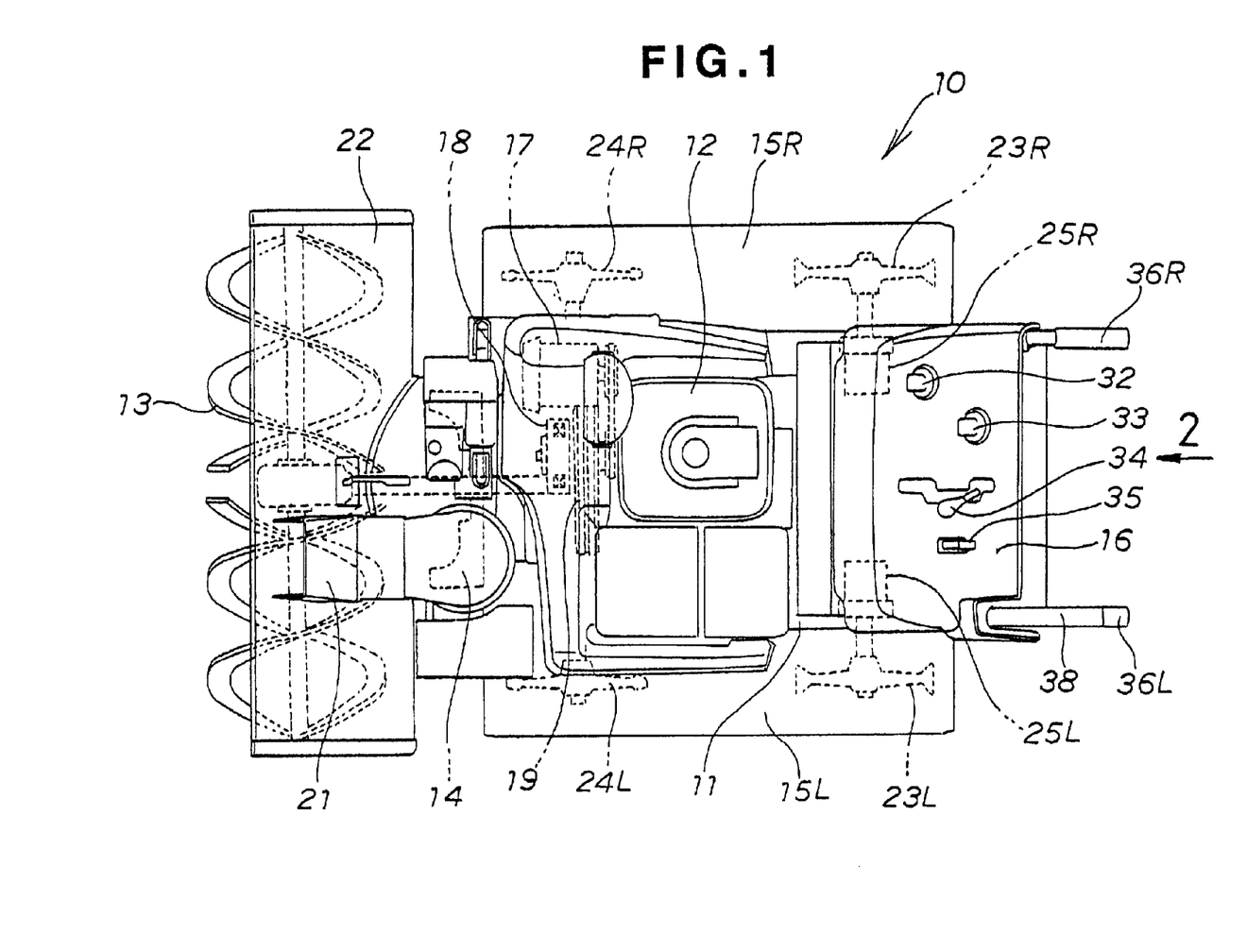
FIG. 1 is a plan view of a snow removal machine having an engine and electric motors, exemplifying an electric vehicle of the present invention.

Referring initially to FIG. 1, a snow removal machine 10 exemplifies a working machine of the present invention. The snow removal machine 10 includes an engine 12 mounted on a machine body 11. The snow removal machine 10 further includes a working section consisting of an auger 13 and a blower 14 provided at the front of the machine body 11, crawlers 15L and 15R provided at the left and right of the machine body 11, and a control panel 16 provided at the rear of the machine body 11. The snow removal machine 10 is a walk-behind working machine to be led by an operator walking behind the control panel 16.

The engine 12 drives a generator 17 for rotation and drives the auger 13 and the blower 14 for rotation via an electromagnetic clutch 18 and a belt 19.

Electric power output from the generator 17 is supplied to left and right electric motors 25L and 25R for driving left and right driving wheels 23L and 23R via a battery 43 (See FIG. 4) arranged below the control panel 16.

The auger 13 collects snow accumulating on the ground to the center. The blower 14 throws the snow collected by the auger 13 outside of the machine via a shooter 21. The auger 13 is covered by an auger housing 22.

The left crawler 15L is wound around and extended between the left driving wheel 23L and a left driven wheel 24L. In this embodiment, the left driving wheel 23L is rotated in forward and reverse directions by the left electric motor 25L. The right crawler 15R is wound around and extended between the right driving wheel 23R and a right driven wheel 24R. The right driving wheel 23R is rotated in forward and reverse directions by the right electric motor 25R.

In a conventional snow removal machine, a single engine (a gasoline engine or a diesel engine) drives both a working system (auger rotating system) and a driving system (crawler driving system). In this embodiment, the engine 12 drives the working system (auger rotating system), and the electric motors 25L and 25R drive the driving system (crawler driving system).

Electric motors are suitable for performing traveling speed control, turning control and forward and reverse travel switching control of the snow removal machine 10. A powerful internal combustion engine is suitable for powering the working system susceptible to rapid load change.

Figure 2:
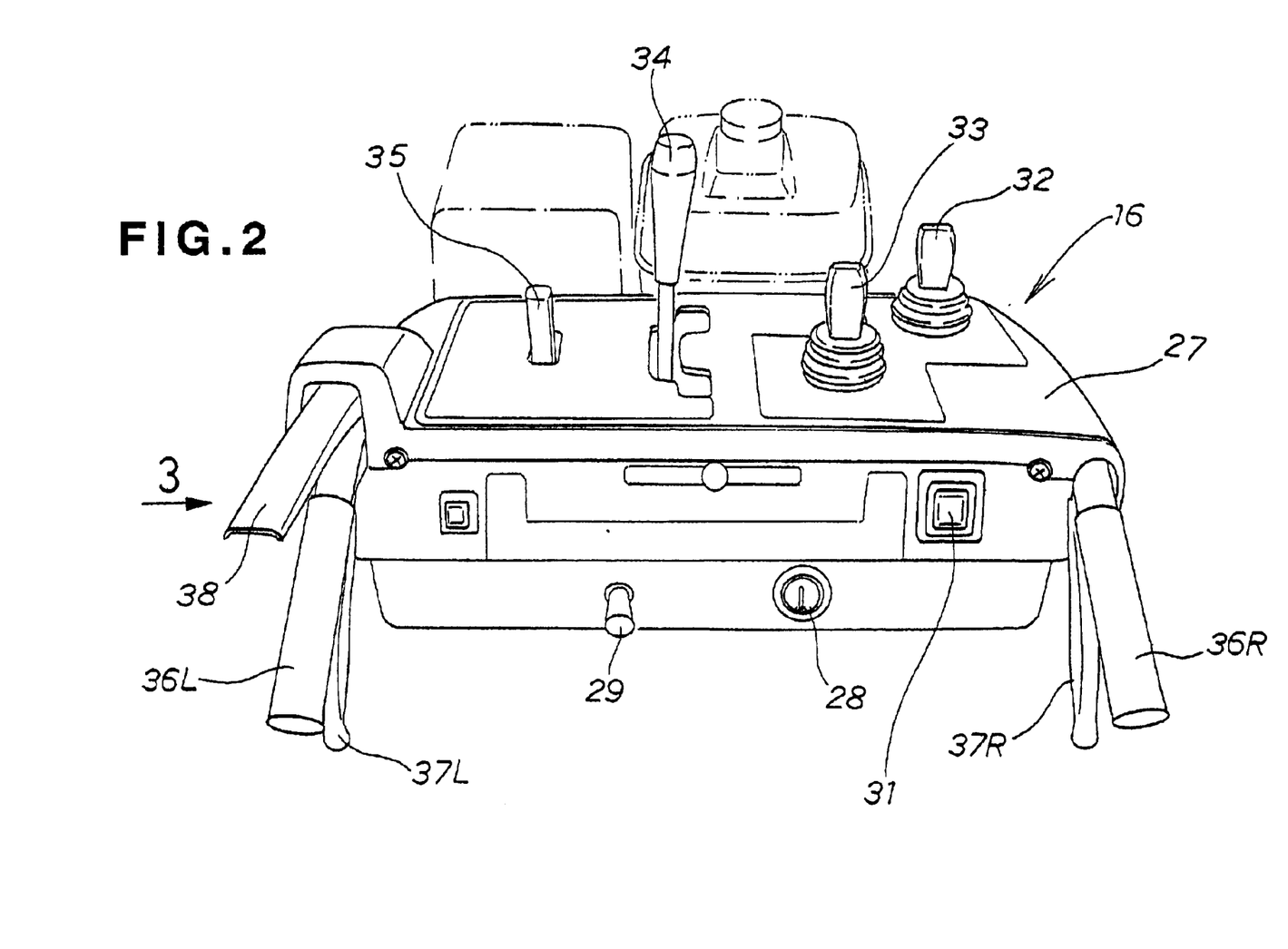
FIG. 2 is a view taken in the direction of arrow 2 in FIG. 1, illustrating a control section of the snow removal machine.

As shown in FIG. 2, the control panel 16 has, on the front surface of a control box 27 to face an operator, a main switch 28, an engine choke 29, a clutch control button 31 and other components. On the top surface of the control box 27, a snow throwing direction adjustment lever 32, an auger housing orientation adjustment lever 33, a directional speed lever 34 as a directional speed instructing member for the driving system, and an engine throttle lever 35 for the working system. On the right of the control box 27, a grip 36R and a right turn control lever 37R are provided. On the left of the control box 27, a grip 36L, a left turn control lever 37L and a drive preparatory lever 38 are provided.

The left and right turn control levers 37L and 37R are similar to brake levers, but cannot provide complete braking effects as will be described below. The left and right turn control levers 37L and 37R are operated for reducing the rotation of the left and right electric motors 25L and 25R to turn the machine body. Therefore those components are not referred to as brake levers.

The main switch 28 is a known switch into which a main key is inserted and rotated for starting the engine. The engine choke 29 can be pulled to increase the density of air-fuel mixture. The snow throwing direction adjustment lever 32 is operated to change the direction of the shooter 21 (See FIG. 1). The auger housing orientation adjustment lever 33 is operated to change the orientation of the auger housing 22 (See FIG. 1).

Figure 3:
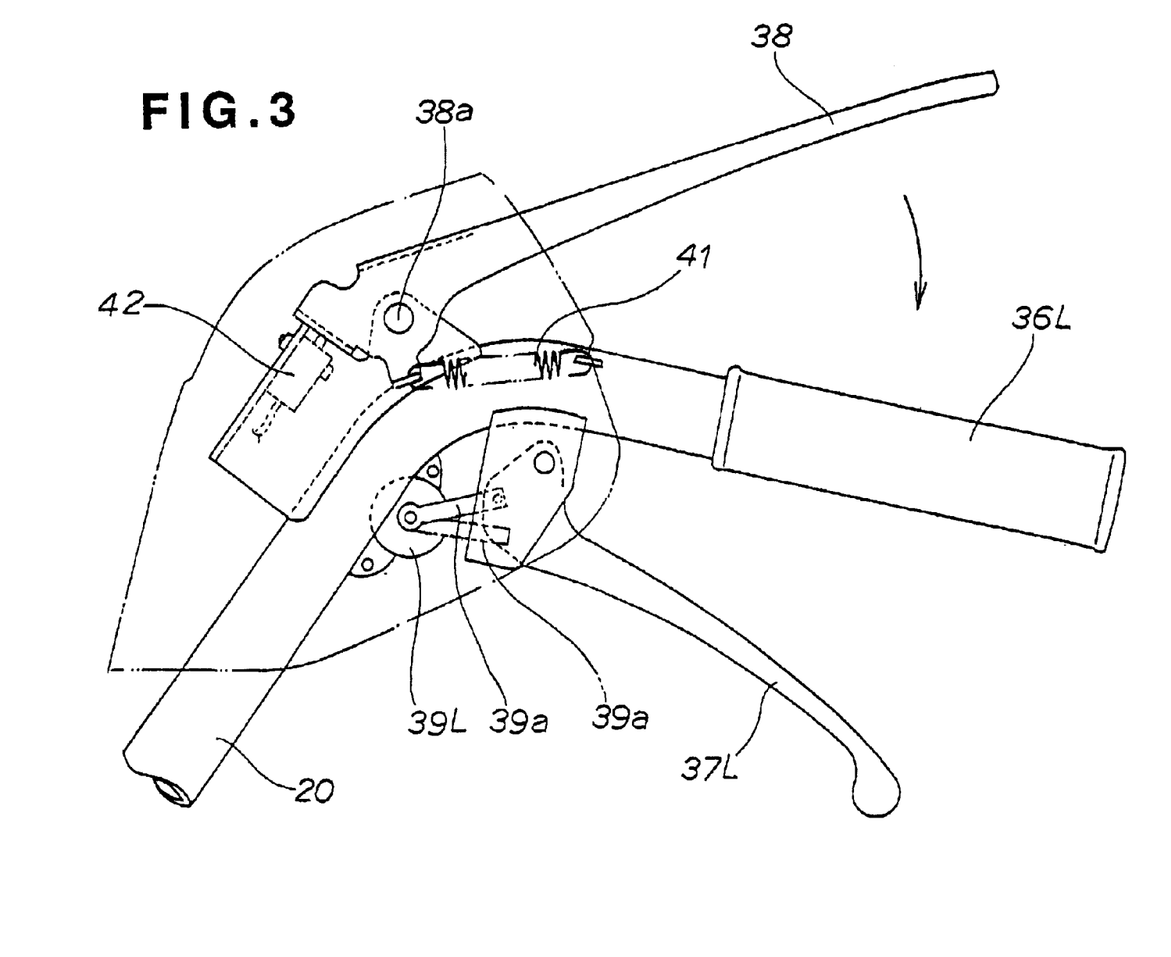
FIG. 3 is a view taken in the direction of arrow 3 in FIG. 2, illustrating a left turn control lever and a drive preparatory lever.

As shown in FIG. 3, handling the left turn control lever 37L can rotate an arm 39a of a potentiometer 39L at an angle to a position shown by imaginary lines. The potentiometer 39L produces electric information in accordance with the rotational position of the arm 39a. The right turn control lever 37R operates in a similar manner.

The drive preparatory lever 38 is rotatable about a shaft 38a mounted to a handle 20 and is constantly biased by an extension spring 41 in a direction to turn a switch 42 off. Handling the drive preparatory lever 38 toward the left grip 36L by the left hand of the operator turns the switch 42 on. In short, handling the drive preparatory lever 38 turns the switch 42 from off to on. The produced ON signal is supplied to a controller 44 shown in FIG. 4. The controller 44 recognizes the completion of drive preparation upon receiving the ON signal.

Figure 4:
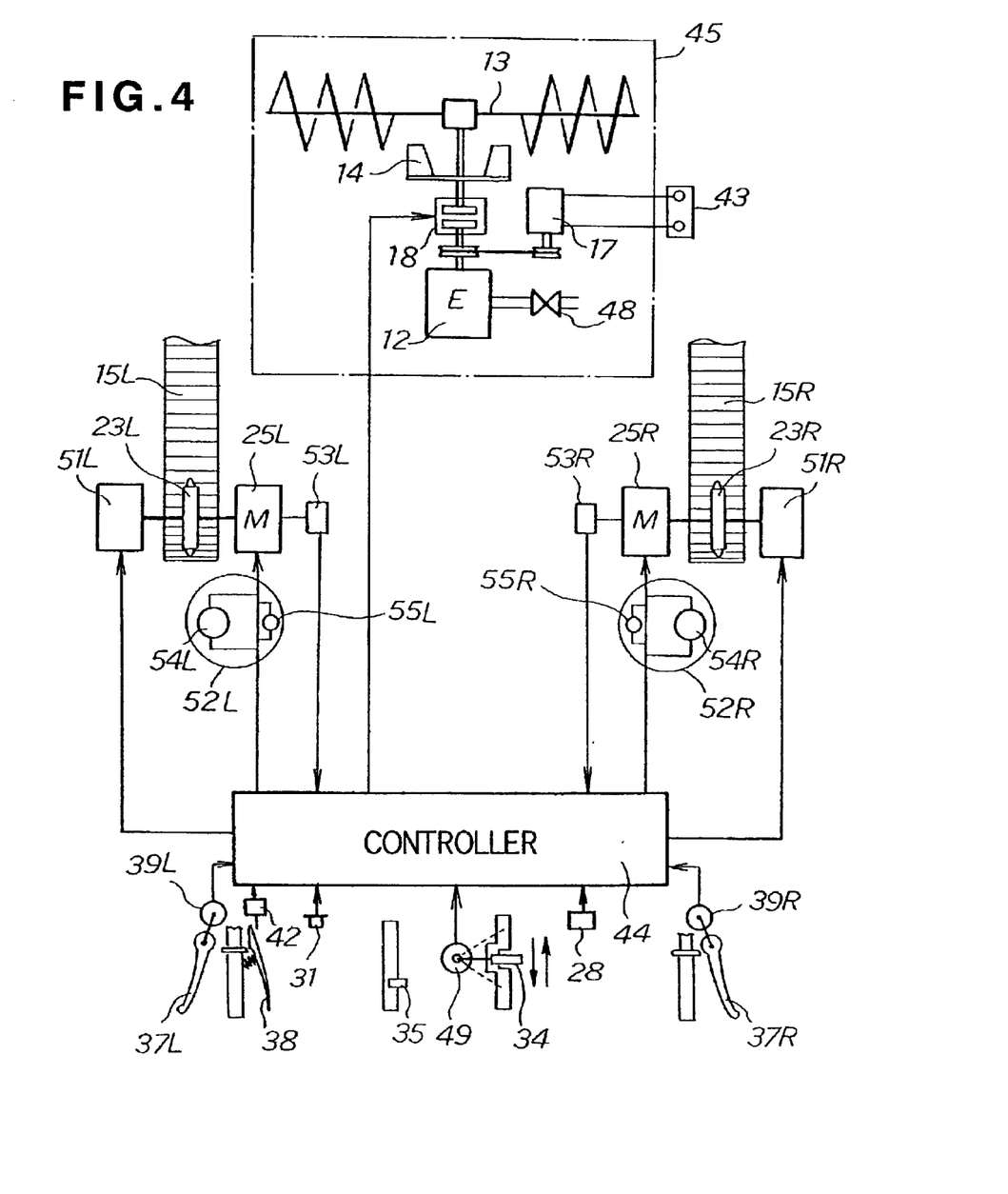
FIG. 4 is a control system diagram of the snow removal machine shown in FIG. 1.

FIG. 4 illustrates an electric system diagram of the snow removal machine according to the present invention. The controller 44 is provided in the control panel.

The engine 12 is started by rotation of a starter (not shown) connected to the battery 43 when the main switch 28 is turned on. The engine 12 drives the generator 17 for rotation and the output power is supplied to the battery 43.

The engine throttle lever 35 is connected to a throttle valve 48 via a throttle wire (not shown). The engine throttle lever 35 is operated to adjust the opening of the throttle valve 48, adjusting the number of revolutions of the engine 12.

The drive preparatory lever 38 is handled to turn the switch 42 on. The ON signal is supplied to the controller 44. Handling the drive preparatory lever 38 allows the operation of the clutch control button 31. In this state, the clutch operation button 31 is operated to bring the electromagnetic clutch 18 of the working system 45 into a connecting state, driving the blower 14 and the auger 13 for rotation. Either releasing the drive preparatory lever 38 or operating the clutch control button 31 for disconnection brings the electromagnetic clutch 18 into a disconnecting state.

The snow removal machine of this embodiment has left and right electromagnetic brakes 51L and 51R as brakes corresponding to parking brakes of a common vehicle. The electromagnetic brakes 51L and 51R are brought into a braking state when the directional speed lever 34 is put in a neutral region. When the main switch 28 is in an on state (start position) and the drive preparatory lever 38 is handled, in other words, when the two conditions are satisfied, switching the directional speed lever 34 to a forward position or a reverse position brings the electromagnetic brakes 51L and 51R into a released state (non-braking state), propelling the snow removal machine forward or backward.

Figure 5:
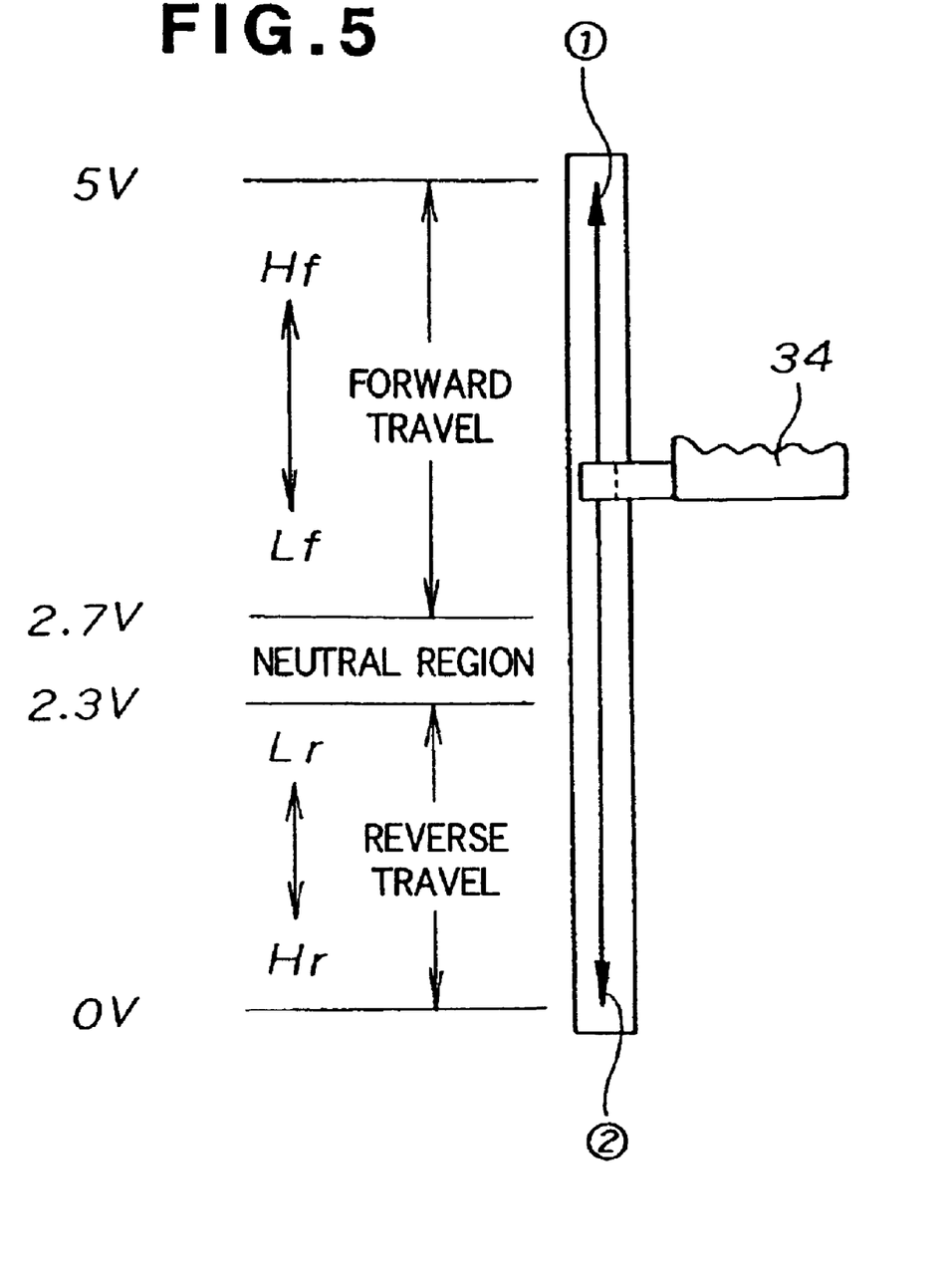
FIG. 5 is a diagram illustrating the operating range of a directional speed lever shown in FIG. 4.

The directional speed lever 34 is shown in detail in FIG. 5. From FIG. 5, the directional speed lever 34 can move between a forward region, a neutral region and a reverse region. In the forward region, Lf indicates low-speed forward travel and Hf high-speed forward travel. The forward traveling speed is adjustable between Lf and Hf. The directional speed lever 34 is operated to adjust the number of revolutions of the left and right electric motors 25L and 25R via the controller 44 and left and right motor drivers 52L and 52R shown in FIG. 4. In the reverse region, Lr indicates low-speed reverse travel and Hr high-speed reverse travel. Reverse traveling speed is controllable between low-speed reverse travel Lr and high-speed reverse travel Hr.

A potentiometer 49 shown in FIG. 4 generates, as shown in FIG. 5, a voltage of O volt at the highest speed in reverse travel, a voltage of 5 volts at the highest speed in forward travel, and a voltage from 2.3 to 2.7 volts in the neutral region.

The controller 44 receives the position information of the directional speed lever 34 from the potentiometer 49 and controls the rotation direction and the rotational speed of the left and right electric motors 25L and 25R via the left and right motor drivers 52L and 52R. The rotational speed of the left and right electric motors 25L and 25R are detected by rotation sensors 53L and 53R and the detection signals are fed back to the controller 44. Based on the detection signals, the controller 44 controls the rotational speed of the electric motors 25L and 25R to a predetermined value. As a result, the left and right driving wheels 23L and 23R rotate in a desired direction at a predetermined speed, propelling the vehicle.

Braking during travel is performed through the following steps. The motor drivers 52L and 52R of this embodiment include regenerative brake circuits 54L and 54R. In this embodiment, electrical switching changes the electric motors 25L and 25R into generators for power generation. Generating voltage higher than the battery voltage enables storing electric energy in the battery 43. This is the operating principle of regenerative brakes.

The left potentiometer 39L detects the degree of handling of the left turn control lever 37L. In response to a signal detected by the left potentiometer 39L, the controller 44 activates the left regenerative brake circuit 54L and reduces the rotational speed of the left electric motor 25L.

The right potentiometer 39R detects the degree of handling of the right turn control lever 37R. In response to a signal detected by the right potentiometer 39R, the controller 44 activates the right regenerative brake circuit 54R and reduces the rotational speed of the right electric motor 25R.

The snow removal machine is turned left by handling the left turn control lever 37L and is turned right by handling the right turn control lever 37R.

Any of the following operations stops the travel of the snow removal machine.

i) Return the directional speed lever 34 to the neutral position.

ii) Release the drive preparatory lever 38.

iii) Return the main switch 28 to the off position.

Short-circuiting brake circuits 55L and 55R are used for the stopping. The left short-circuiting brake circuit 55L short-circuits the two poles of the electric, motor into a suddenly braked state. The right short-circuiting brake circuit 55R operates in the same manner.

Returning the main switch 28 to the off position after the snow removal machine stops traveling activates the electromagnetic brakes 51L and 51R to apply the parking brakes.

Now a control method of starting the driving system of the snow removal machine will be described.

Figure 6:
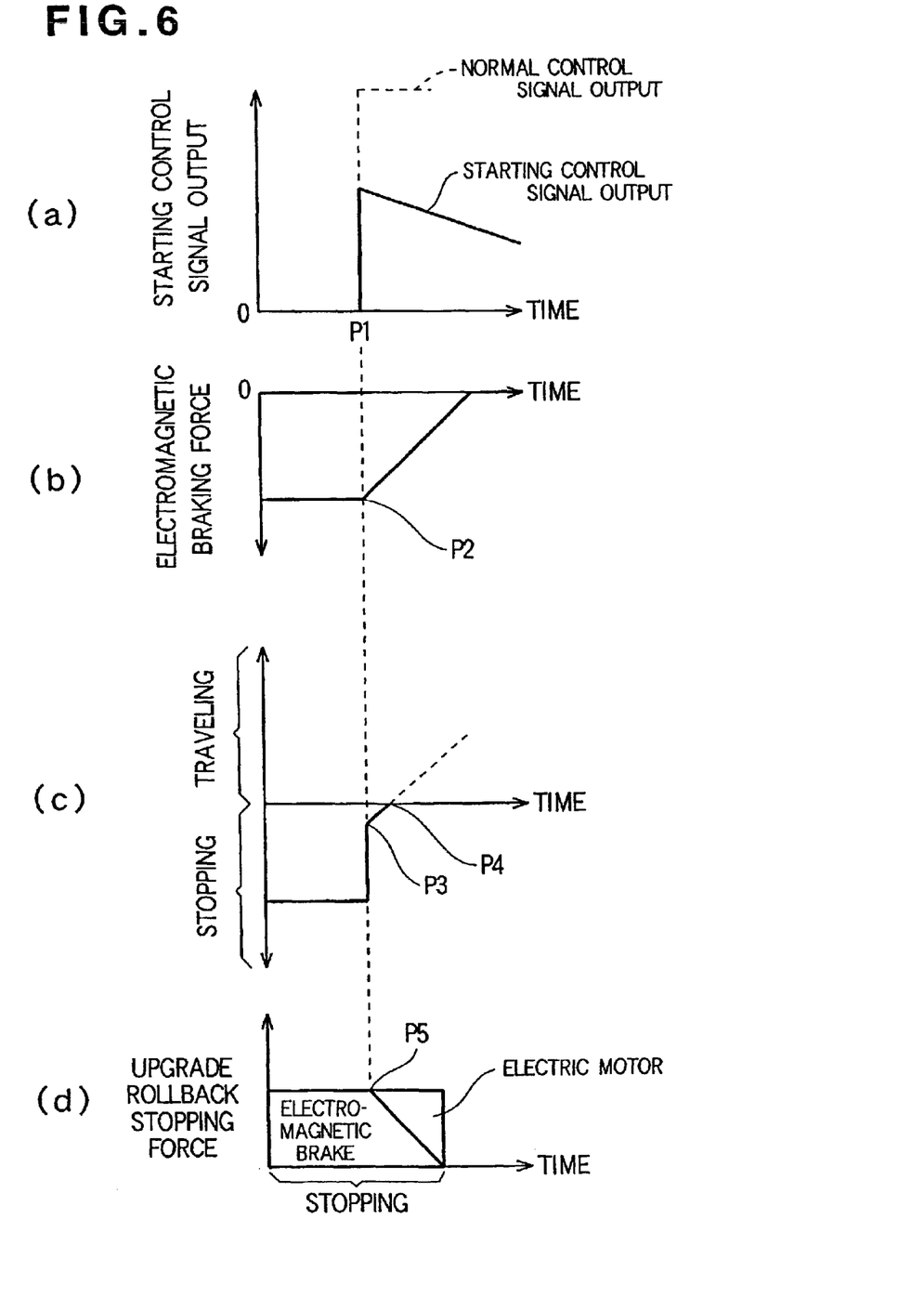
FIG. 6 is a graphic illustration of a relationship between a starting control signal output and an electromagnetic brake force according to the present invention.

(a), (b), (c) and (d) of FIG. 6 are graphs illustrating the relationship between a starting control signal output and an electromagnetic brake force in the present invention, in which the horizontal axes are time axes.

(a) of FIG. 6 is a graph of a starting control signal output. As compared with a normal control signal output shown in broken lines, a starting control signal output shown in solid lines is set smaller to about 50%. The starting control signal output generated at P1 where a command from the controller 44 is received is controlled to gradually decrease with time.

(b) of FIG. 6 is a graph of an electromagnetic brake force. At P2 (equal to P1 in time) where a release command is received, the brakes are released from a full-braking state. Mechanical necessity of time for the full release of the brakes results in a gradual reduction of braking torque.

(c) of FIG. 6 is a graph with the graphs of (a) and (b) of FIG. 6 combined thereinto. Although belonging to different orders, the control signal output and the brake force are combined for descriptive necessity. Lower part from the time axis indicates stopping and upper part indicates traveling. An upward-sloping curve starts from P3 (nearly equal to P1 in time) and meets the time axis at P4. P4 indicates a kind of equilibrium point immediately before the electric motors start rotating even though the electromagnetic brake force shown in FIG. 6(*b*) still exists, at which the brake force and the electric motor output are assumed to be balanced.

(d) of FIG. 6 is an explanatory diagram of an upgrade rollback stopping force, prepared for convenience. Before P5 (equal to P1 in time), the electromagnetic brakes provide the upgrade rollback stopping force. From P5, the electric motors also provide the force, increasing their share with time. Thus the electric vehicle is prevented from rolling back on an upgrade when the electromagnetic brakes are released.

Figure 7:
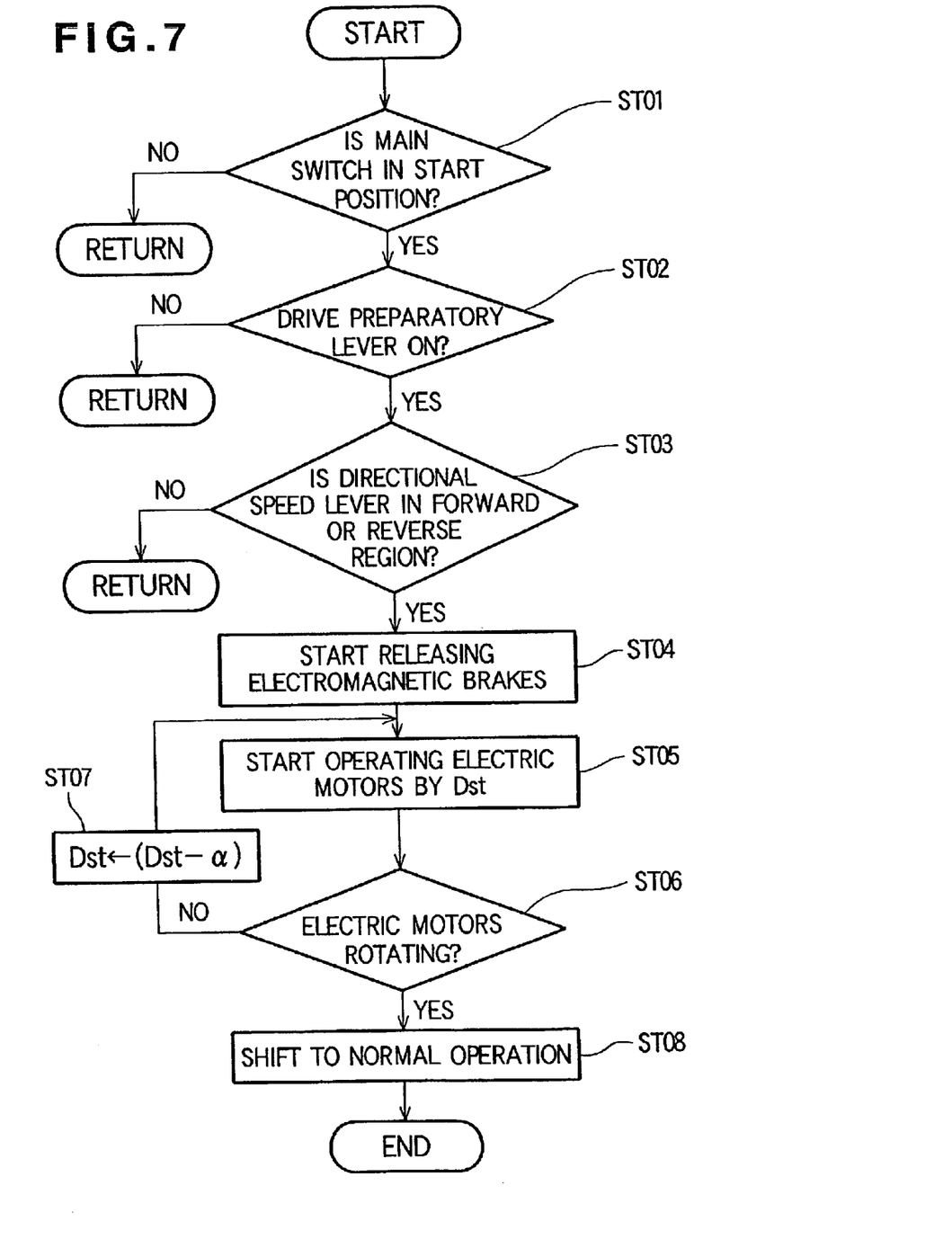
FIG. 7 is a flow diagram illustrating an example of drive starting control of a controller shown in FIG. 4.

FIG. 7 is a flow diagram of travel starting control according to this embodiment.

Step (hereinafter abbreviated as "ST") 01: Check whether or not the main switch 28 (See FIG. 4) is in the start position. When the answer is NO, the operation returns and does not proceed to the following control steps. When YES, proceed to ST02.

ST02: Check whether or not the drive preparatory lever 38 (See FIG. 4) is on (on when handled). When the answer is NO, the operation returns and stops controlling. When YES, proceed to ST03.

ST03: Check whether or not the directional speed laver 34 (See FIG. 4) is in a forward or reverse position. When the answer is NO, the operation returns and stops controlling. When YES, proceed to ST04.

ST04: With the above conditions satisfied, the controller 44 shown in FIG. 4 starts releasing the left and right electromagnetic brakes 51L and 51R. A certain period of time is required for the completion of release of the electromagnetic brakes.

ST05: The controller 44 simultaneously outputs a starting control signal to the motor drivers 52L and 52R for starting the electric motors 25L and 25R (See FIG. 4). The starting control signal output at this time is referred to as Dst. The signal output Dst corresponds to a PI output under PI (proportional-plus-integral) control and a PID output under PID (proportional-plus-integral-plus-derivative) control. The starting control signal output Dst is preferably set smaller than a normal control signal output, that is, in the relationship of Dst<normal control signal output.

ST06: Check whether or not the electric motors 25L and 25R are in a rotating state. More specifically, the rotation sensors 53L and 53R shown in FIG. 4 monitor it. When output values of the rotation sensors 53L and 53R are more than a predetermined value, the motors 25L and 25R are assumed to be rotating. The predetermined value indicates a few degrees when converted into a motor shaft rotation angle. When the answer is YES, the operation proceeds to ST08. When NO, that is, the electric motors substantially stop, proceed to ST07.

ST07: A value resulting from the subtraction of a (e.g., 1.0%) from the starting control signal output Dst is set as a new starting control signal output Dst. The above ST05, ST06 and ST07 are repeated to gradually reduce the starting control signal output Dst, resulting in a solid curve shown in (a) of FIG. 6. During the reduction, the release of the electromagnetic brakes progresses and at a certain point of time (P4 in (c) of FIG. 6), the answer turns to YES at ST06.

ST08: When the answer is YES at ST06, that is, the electric motors are in a rotating state, the control signal applied to the electric motors is switched to a normal control signal. This allows a shift to normal operation.

Figure 8A:
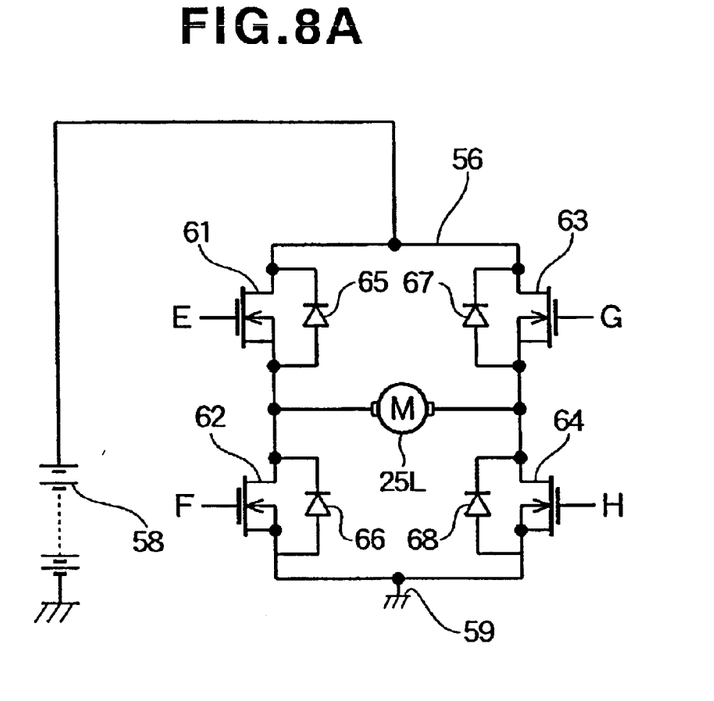
FIGS. 8A and 8B respectively illustrate a circuit diagram and a mode table of the electric motors according to the present invention.
Figure 8B:
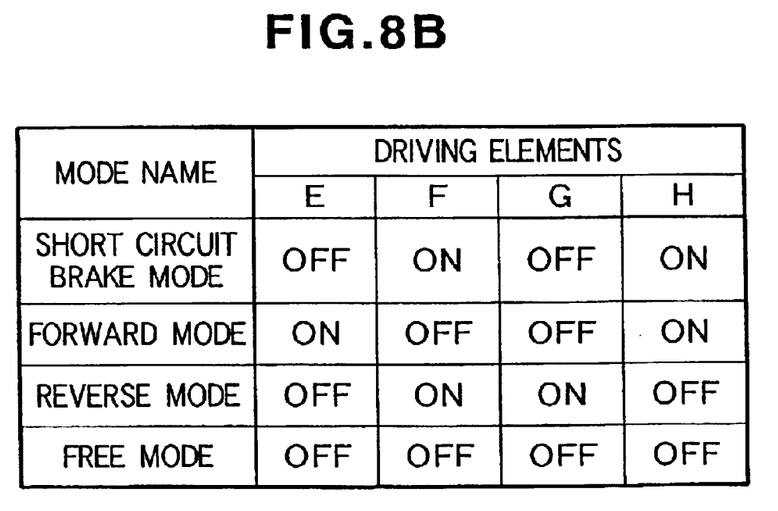

Now the driving of the electric motors used in this embodiment will be described with reference to FIGS. 8 to 10. FIG. 8A is a circuit of the electric motors. FIG. 8B shows a mode table of the electric motors.

In FIG. 8A, a high frame of a control circuit 56L of the electric motor 25L (an upper half of the circuit) is connected to a power source 58. A low frame (a lower half of the circuit) is connected to a ground 59. In a left high frame and a left low frame, an E driving element 61 and an F driving element 62 are disposed, respectively. In a right high frame and a right low frame, a G driving element 63 and an H driving element 64 are disposed, respectively. Diodes 65 to 68 are connected in parallel with the E to H driving elements 61 to 64, functioning as bypass circuits. The E to H driving elements 61 to 64 are switched on and off in response to control signals.

Field Effect transistors (FET) are suitable for the E to H driving elements 61 to 64. Ordinary transistors are low-impedance devices activated by current while FETs are high-impedance devices activated by voltage. High impedance devices are generally suitable for being interposed in the circuit 56L as shown in the figure. However, FETs have such disadvantages as operating slowly as compared with other electronic components and taking time in operation. The time corresponding to the operating time is herein referred to as t2. The time t2 will be described below.

FIG. 8B is a mode table for the circuits of the electric motors, illustrating mode names on the left and the ON or OFF states of the E to H driving elements on the right.

In a short circuit brake mode, the F and H driving elements are turned ON and the E and G driving elements are turned OFF. In FIG. 8A, the power source 58 is isolated from the electric motor 25L to form a short circuit in the low frame. This applies a sudden brake to the electric motor 25L. This state is referred to as a short circuit brake.

In a forward mode, the E and H driving elements are turned ON and the F and G driving elements are turned OFF. In FIG. 8A, a current flows through the E driving element, the electric motor 25L and the H driving element 64 in this order, forwardly rotating the electric motor 25L. In a reverse mode, the opposite condition reversely rotates the electric motor 25L.

In a free mode, the E to H driving elements are all turned OFF. No current flow through the electric motor allows its idle rotation.

Figure 9:
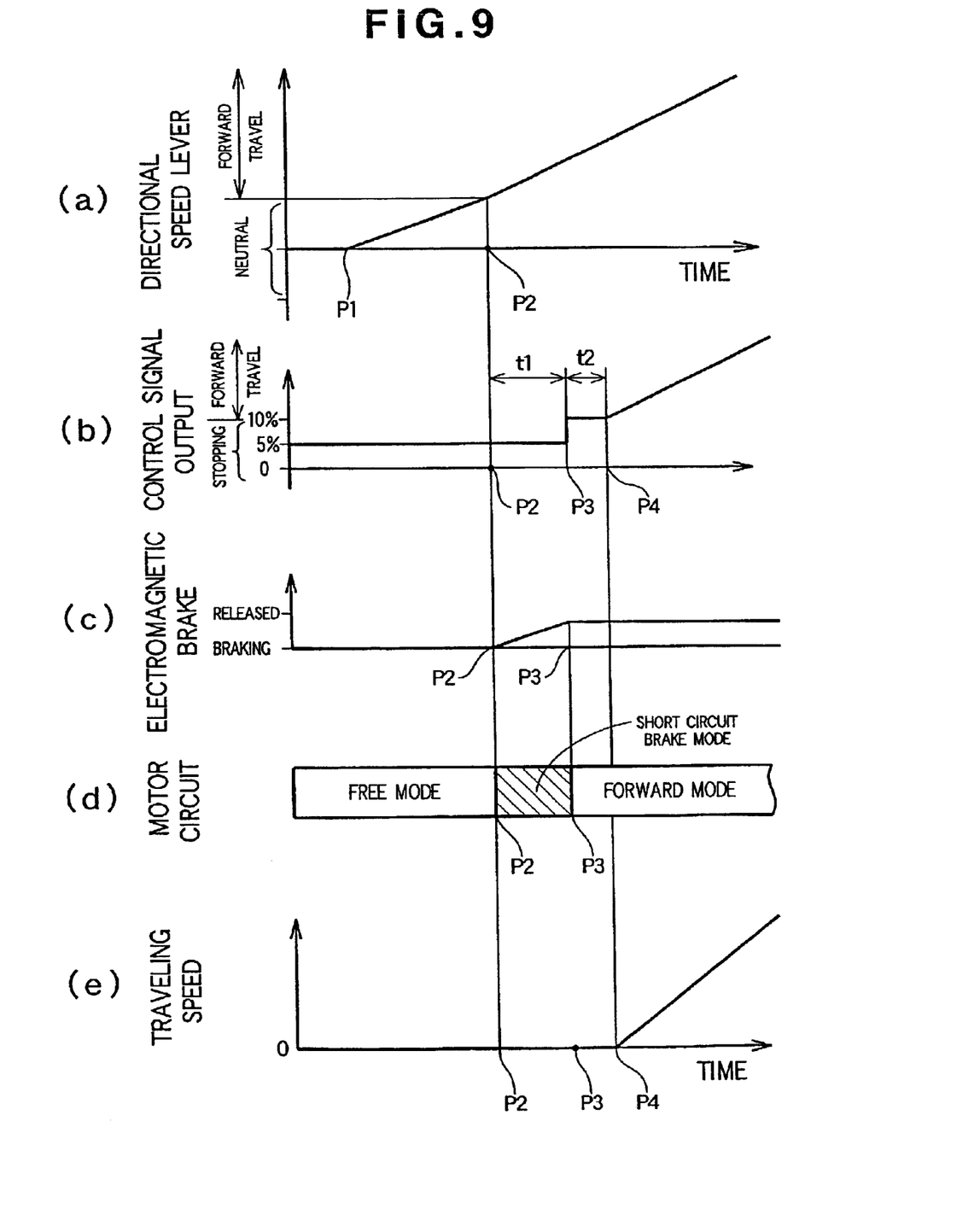
FIG. 9 is a graphic illustration of a relationship in timing between the directional speed lever, the control signal output to the electric motors and the electromagnetic brakes.

(a) to (e) of FIG. 9 show time charts explaining the functions of the present embodiment.

The vertical axis of (a) of FIG. 9 indicates the position of the directional speed lever. P1 is a point at which manual movement of the directional speed lever in the center of the neutral position toward the forward region starts. At P2, the lever passes the boundary between the neutral region and the forward region (See 2.7 volts in FIG. 5). Thereafter, the directional speed lever is continuously moved.

The vertical axis of (b) of FIG. 9 indicates a control signal for the electric motors. The control signal is a PI control signal or a PID control signal. In this embodiment, driving control is performed in a range from 10% to 90% of the full scale 100% with the lowermost 10% and the uppermost 10% cut. Since the directional speed lever is in the neutral region before P2 in (a) of FIG. 9, the control signal shown in (b) of FIG. 9 is set at 5%, which is less than 10%. Although the control signal may be 0, setting it at 5% is convenient for detecting failure such as breaking of wire. Specifically, an output of 5% shows normal and an output of less than 5% shows braking of wire.

In this embodiment, the control signal is increased to 10% at P3 at which time t1 has elapsed since P2. The time t1 is a releasing-required time between the start of release of the electromagnetic brakes and the completion of the release. Measurements of the time required for switching the electromagnetic brakes from the braking state to the released state vary because of variations in their mechanical components. A value artificially determined based on an average value of the measured values or the like is used as the time t1. The time t2 is determined in the same manner.

The time t1 depending on the size and structure of the electromagnetic brakes is set at about several milliseconds to dozens of milliseconds. The time t2 is similarly set at about several milliseconds to dozens of milliseconds.

The control signal is turned to increase at P4 at which the time t2 has elapsed since P3. It may be conceived that the control signal output may be increased to more than 10% in (b) of FIG. 9 immediately after the directional speed lever reaches P2, going beyond the neutral region in (a) of FIG. 9. This embodiment is, however, characterized in that a waiting time (t1+t2) is provided.

(c) of FIG. 9 illustrates the operating state of the electromagnetic brakes. Up to P2, the electromagnetic brakes are in the braking state at the command from the controller because the directional speed lever in (a) of FIG. 9 is in the neutral region. At P2, the electromagnetic brakes start releasing. At P3, the electromagnetic brakes complete the releasing. The time between P2 and P3 thus agrees to the time t1 required for releasing the electromagnetic brakes.

(d) of FIG. 9 illustrates mode variation of the motor circuits. Up to P2, the motor circuits are in the free mode (See FIG. 8B) at the command from the controller. In the free mode, the motors are idly rotatable. From P2 to P3, the motors are in the short circuit brake mode (See FIG. 8B) at the command from the controller. In (c) of FIG. 9, since the electromagnetic brakes are released between P2 and P3, the short circuit brakes are applied This brings the electric motors into the braked state.

The vertical axis of (e) of FIG. 9 indicates the traveling speed. At P4 in (b) of FIG. 9 equal to the time P4 where the control signal exceeds 10%, the traveling speed exceeds 0 and the vehicle is in a traveling state.

In summary, the present embodiment is characterized in the setting of the waiting time, the time t1 and the time t2, shown in (b) of FIG. 9.

The provision of the time t1 can prevent an occurrence of such an inconvenience that the electric motors are brought into an operating state while the electromagnetic brakes are in the braking state. This prevents brake drag, extending the life of the electromagnetic brakes.

Further, the provision of the time t2 enables gaining time during which the motors are actually rotated from the short circuit brake mode. This allows a reduction in electrical load applied to the driving elements 61 to 64 shown in FIG. 8B, extending the life or reducing the size of the driving elements 61 to 64.

Another point is that in (e) of FIG. 9, the control signal to the electric motors is 5% between P2 and P3 (See (b) of FIG. 9), so that the electric motors do not produce torque although being in the short circuit braked state. Between P3 and P4, the control signal output to the electric motors is 10% and the circuits are in the forward mode, so that small torque immediately before starting is produced. Between P3 and P4, a force against the external force (small torque insufficient for travel) is thus generated by the electric motors in place of the short circuit brakes. As a result, the vehicle is prevented from rolling back on a grade also between P3 and P4.

Now a control method of starting the driving system of the snow removal machine will be described with reference to a drive starting control flow shown in FIG. 10.

ST21: Settings in a halt condition are listed. Specifically, it is assumed that the main switch is in the start position, the drive preparatory lever is in the on position, the directional speed lever is in the neutral position, the electric motor control signal output is 5% (See (b) of FIG. 9) and the motor circuits are in the free mode (See (b) of FIG. 8).

ST22: Check whether or not the directional speed lever 34 (See FIG. 4) is in the forward or reverse region. When the answer is NO, the operation returns and stops controlling. When YES, proceed to ST23.

ST23: When the above conditions are satisfied, the controller starts releasing the electromagnetic brakes 51L and 51R (See FIG. 4). The electromagnetic brakes require a certain period of time for completing the releasing.

ST24: The controller simultaneously switches the motor circuits to the short circuit brake mode (See FIG. 8B).

ST25: Start a first timer incorporated in the controller.

ST26: Check whether or not time T1 counted by the first timer reaches the time t1 required for the release of the electromagnetic brakes. When the answer is YES, proceed to ST27.

ST27: The controller switches the motor circuits into the forward or reverse mode in accordance with the directional speed lever.

ST28: The controller simultaneously changes the control signal to the electric motors to 10% (See P3 in (b) of FIG. 9).

ST29: Start a second timer incorporated in the controller.

ST30: Check whether or not time T2 counted by the second timer reaches the time T2 required for releasing the short circuit brakes. When the answer is YES, proceed to ST31.

ST31: The controller increases the control signal to the electric motors in accordance with the position of the directional speed lever (after P4 in (b) of FIG. 9). This starts the travel of the vehicle.

Figure 10:
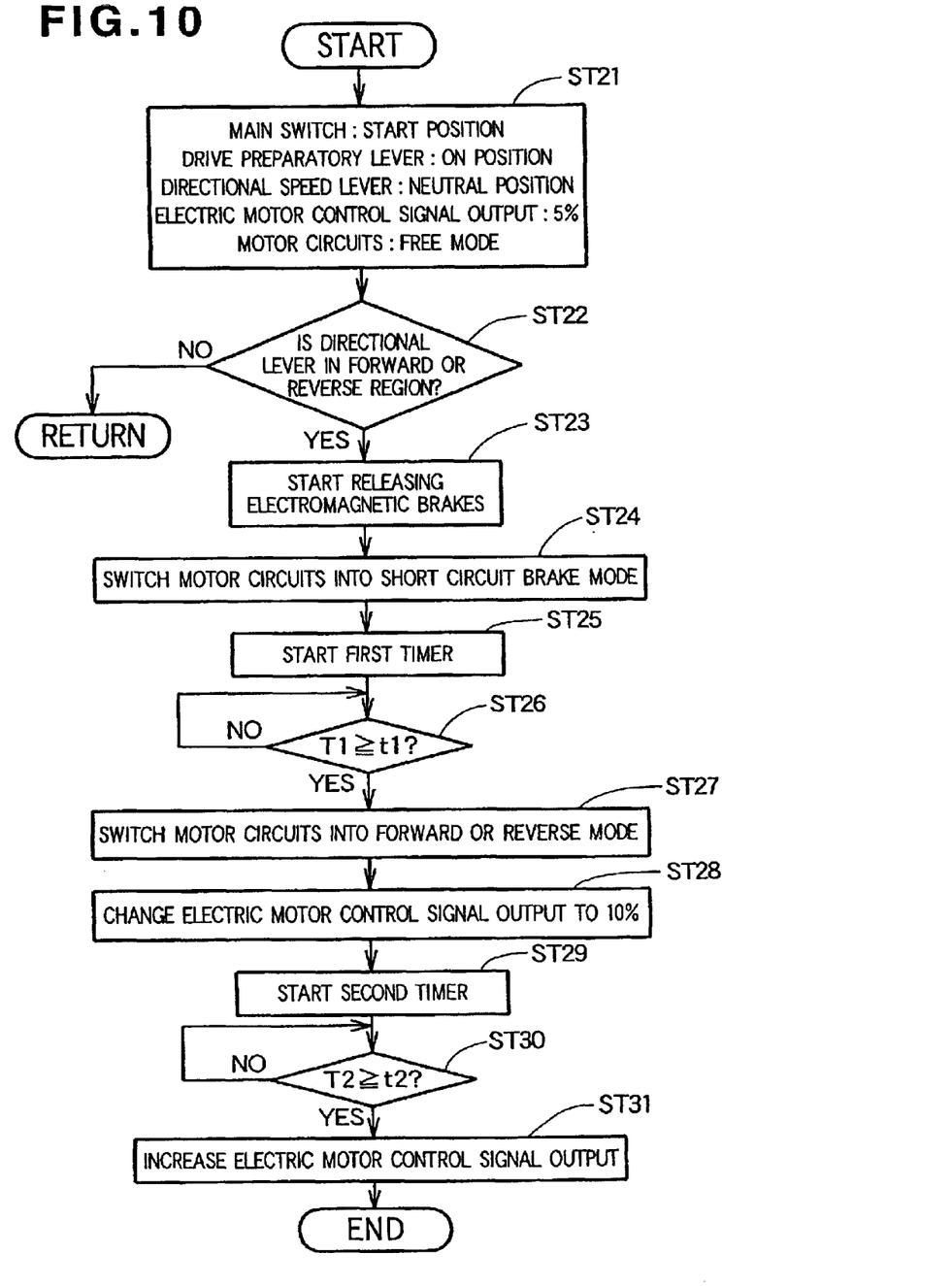
FIG. 10 is a flow diagram illustrating another example of drive starting control of the controller shown in FIG. 4.

In summary, in the present method, an electric vehicle which is driven by electric motors based on the operation of a directional speed control member with which forward travel, neutral and reverse travel can be specified, and can be applied holding brakes such as parking brakes by electromagnetic brakes when not traveling, which electric vehicle includes a controller performing control comprising the steps of:

receiving information on the switching of the directional speed control member from neutral to the forward or reverse travel (ST22 in FIG. 10);

starting the release of the electromagnetic brakes (ST23 in FIG. 10) and simultaneously switching the circuits of the electric motors into a short circuit brake mode (ST24 in FIG. 10), and maintaining it for time t1 corresponding to the time required for switching the electromagnetic brakes from the braking state into the released state (ST26 in FIG. 19);

switching the circuits of the electric motors into a forward or reverse mode as specified by the directional speed control member while maintaining a control signal to the electric motors at an output corresponding to zero vehicle speed (ST28 in FIG. 10), and maintaining it for time t2 corresponding to the time required for the circuit switching of the electric motors (ST30 in FIG. 10); and allowing an increase in the control signal output to the electric motors after the lapse of the time t2 and bringing the electric motors into a driving state in accordance with the directional speed control member (ST31 in FIG. 1).

The electric vehicle of the present invention is not limited to the snow removal machine shown in the embodiment, and may be of any kind as long as being an electric vehicle such as an electric carrier or an electric caddie cart.

The snow removal machine in the present embodiment has left and right electric motors. An electric vehicle of this invention may be of a type having a single electric motor for driving left and right driving wheels.

The present embodiment has the single directional speed lever. Several directional speed levers may be provided to share the functions. The directional speed control member may be a lever, a dial, a switch or an equivalent.

The present disclosure relates to the subject matter of Japanese Patent Application No. 2001-340243 filed Nov. 6, 2001, No. 2001-352098 filed Nov. 16, 2001, No. 2002-074939 filed Mar. 18, 2002, and No. 2002-074942 filed Mar. 18, 2002, the disclosures of which are expressly incorporated herein by reference in their entireties.

What is claimed is:

1. An electric vehicle comprising:

a vehicle body;

a directional speed member mounted to the vehicle body and being movable to a forward travel position, a neutral state position and a reverse travel position of the vehicle;

a pair of left and right electric motors mounted to the vehicle body for driving left and right driving wheels based on the position of the directional speed member;

left and right driving circuits for driving the left and right electric motors;

a pair of left and right electromagnetic parking brakes for applying holding brakes to prevent rotation of the left and right driving wheels when the said vehicle is in the neutral state, each of the left and right electromagnetic parking brakes being selectively operative in a braking state in which it applies the holding brake and a released state in which it releases the holding brake;

a pair of left and right short-circuiting brake circuits associated with the pair of left and right electric motors, respectively, and being operative to short-circuit two poles of each respective electric motor to thereby bring the electric motors into a suddenly braked state to prevent rotation of the left and right driving wheels; and a controller for controlling movement of the vehicle to prevent drag of the electromagnetic parking brakes by controlling the left and right electromagnetic parking brakes and the left and right short-circuiting brake circuits such that the short-circuiting brake circuits are in an operating state to prevent rotation of the left and right driving wheels during a time period when the left and right electromagnetic parking brakes are being switched from the braking state to the released state.

2. An electric vehicle according to claim 1; wherein the controller outputs a starting control signal to induce the start of the pair of left and right electric motors simultaneously with the start of release of the pair of left and right electromagnetic brakes when the directional speed member is switched from indicating the neutral state to indicating forward or reverse travel, and gradually reduces the starting control signal output until the electric motors are actually in a rotating state.

3. An electric vehicle according to claim 2; wherein the starting control signal output is set smaller than a normal control signal output for rotating the pair of left and right electric motors subsequent to initial movement of the vehicle.

4. An electric vehicle according to claim 1; wherein the controller is responsive to movement of the directional speed member to:

(1) switch the respective short-circuiting brake circuits of the pair of left and right electric motors to a short-circuit brake mode at the start of release of the pair of left and right electromagnetic parking brakes when the directional speed member is switched from indicating the neutral state to indicating forward or reverse travel, and maintaining the short circuit brake mode for a first time period t1 required for switching the electromagnetic brakes from the braking state to the released state;

(2) switch the driving circuits of the electric motors to a forward mode or a reverse mode based on a position of the directional speed member while maintaining a control signal to the electric motors at an output corresponding to zero vehicle speed, and maintaining the forward or reverse mode for a second time period t2 required for circuit switching of the driving circuits of the electric motors to the forward mode or reverse mode; and increase the control signal output to the electric motors after the lapse of the second time period t2 and bring the electric motors into a driving state in accordance with the position of the directional speed member.

5. An electric vehicle according to claim 1; further comprising left and right control handles extending rearward from the vehicle body; left and right grips provided at the ends of the control handles; a left speed control lever provided alongside the left grip for controlling the left electric motor; and a right speed control lever provided alongside the right grip for controlling the right electric motor.

6. An electric vehicle according to claim 2, further comprising an auger mounted to the vehicle body for displacing snow and a blower mounted to the vehicle body for ejecting displaced snow.

7. A transit control method for an electric vehicle having a directional speed control member movable to a neutral state position, a forward movement state position, and a reverse movement state position of the vehicle, left and right electric motors for driving left and right driving wheels based on the position of the directional speed control member, and left and right electromagnetic parking brakes for applying holding brakes to the left and right driving wheels when the vehicle in a neutral state, the method comprising the steps of:

switching the left and right electromagnetic parking brakes from a braking state in which the driving wheels are prevented from rotation to a released state in which the driving wheels can undergo rotation, when the directional speed control member is moved from the neutral state position to either the forward movement state position or the reverse movement state position; and short-circuiting two poles of the left and right electric motors to prevent rotation of the driving wheels during a time period when the left and right electromagnetic parking brakes are being switched from the braking state to the released state, to thereby prevent drag of the electromagnetic parking brakes.

8. A transit control method for an electric vehicle according to claim 7; wherein the electric vehicle further has a tool, an engine for driving the tool and a clutch provided in a power transmission path from the engine to the tool.

9. A transit control method for an electric vehicle according to claim 8; wherein the tool is an auger for displacing snow and a blower for ejecting displaced snow.

10. A transit control method for an electric vehicle according to claim 7; further comprising the steps of outputting a starting control signal to induce the start of the left and right electric motors simultaneously with the start of release of the pair of left and right electromagnetic parking brakes when the directional speed control member is moved from the neutral state position to either one of the forward movement state position or the reverse movement state position; and gradually reducing the starting control signal until the electric motors are actually in a rotating state.

11. A transit control method for an electric vehicle according to claim 7; wherein the step of short-circuiting two poles of the left and right electric motors is performed to maintain the short-circuit state for a first time period t1 required for switching the electromagnetic brakes from the braking state to the released state.

12. A transit control method according to claim 11; further comprising the steps of switching the electric motors to a forward mode or a reverse mode based on a position of the directional speed control member while maintaining a control signal to the electric motors at an output corresponding to zero vehicle speed; maintaining the forward or reverse mode for a second time period t2 required for circuit switching of drive circuits of the electric motors to the forward mode or reverse mode; and increasing the control signal output to the electric motors after the lapse of the second time period t2 to bring the electric motors into a driving state in accordance with the position of the directional speed control member.

13. An electric vehicle comprising:

a vehicle body;

a directional speed member mounted to the vehicle body and being movable to a forward travel position, a neutral state position and a reverse travel position of the vehicle;

an electric motor mounted to the vehicle body for driving left and right driving wheels based on the position of the directional speed member;

a driving circuit for driving the electric motor;

an electromagnetic parking brake for preventing rotation of the left and right driving wheels when the vehicle is in the neutral state, the electromagnetic parking brake being selectively operative in a braking state in which it applies the holding brake and a released state in which it releases the holding brake;

a short-circuiting brake circuit associated with the electric motor and being operative to short-circuit two poles of the electric motor to thereby bring the electric motor into a suddenly braked state to prevent rotation of the left and right driving wheels; and a controller for controlling movement of the vehicle to prevent drag of the electromagnetic parking brake by controlling the electromagnetic parking brake and the short-circuiting brake circuit such that the short-circuiting brake circuit is in an operating state to prevent rotation of the left and right driving wheels during a time period when the electromagnetic parking brake is being switched from the braking state to the released state.

14. An electric vehicle according to claim 13; wherein the controller outputs a starting control signal to induce the start of the electric motor simultaneously with the start of release of the electromagnetic brake when the directional speed member is switched from the neutral state position to either the forward travel position or the reverse travel position, and gradually reduces the starting control signal output until the electric motor is actually in a rotating state.

15. An electric vehicle according to claim 13; wherein the controller is responsive to movement of the directional speed member to:

(1) switch the short-circuiting brake circuit to a short-circuit brake mode at the start of release of the electromagnetic parking brake when the directional speed member is switched from the neutral state position to the forward travel position or the reverse travel position, and maintaining the short circuit brake mode for a first time period t1 required for switching the electromagnetic brake from the braking state to the released state;

(2) switch the driving circuit of the electric motor to a forward mode or a reverse mode based on a position of the directional speed member while maintaining a control signal to the electric motor at an output corresponding to zero vehicle speed, and maintaining the forward or reverse mode for a second time period t2 required for circuit switching of the drive control circuit to the forward mode or reverse mode; and (3) increase the control signal output to the electric motor after the lapse of the second time period t2 and bring the electric motor into a driving state in accordance with the position of the directional speed member.

* * * * *